(12) United States Patent
Yamada et al.

(10) Patent No.: US 7,926,713 B2
(45) Date of Patent: Apr. 19, 2011

(54) SETTLEMENT SERVER, SETTLEMENT REQUEST SERVER AND SETTLEMENT EXECUTION TERMINAL

(75) Inventors: Hiroyuki Yamada, Tokyo (JP); Norihiko Fujita, Tokyo (JP); Hisanori Arai, Tokyo (JP); Koji Ito, Tokyo (JP); Kazuki Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 949 days.

(21) Appl. No.: 11/707,715

(22) Filed: Feb. 16, 2007

(65) Prior Publication Data
US 2008/0197186 A1  Aug. 21, 2008

(51) Int. Cl.
G06K 5/00 (2006.01)
G06F 21/00 (2006.01)

(52) U.S. Cl. .......................................... 235/380; 705/52
(58) Field of Classification Search .................. 235/379, 235/380; 705/52
See application file for complete search history.

(56) References Cited

U.S. PATENT DOCUMENTS
| | | | |
|---|---|---|---|
| 6,556,680 B1* | 4/2003 | Leonardi | 380/247 |
| 2007/0050300 A1* | 3/2007 | Matsuyama | 705/52 |

FOREIGN PATENT DOCUMENTS
| | | |
|---|---|---|
| JP | 10-171887 | 6/1998 |
| JP | 2000-069571 | 3/2000 |
| JP | 2003-060522 | 2/2003 |
| JP | 2004-139571 | 5/2004 |
| JP | 2005-509231 | 4/2005 |

* cited by examiner

*Primary Examiner* — Daniel A Hess
(74) *Attorney, Agent, or Firm* — K&L Gates LLP

(57) ABSTRACT

An object of the present invention is to, in settlement by electronic money, reduce burden on an electronic money server and enhance convenience for users. The function of generating transaction numbers is transferred from the electronic money server to affiliated store servers, so that the transaction numbers are generated by the affiliated store servers. The transaction numbers are each associated with transaction information calculated in accordance with a calculation rule confidential to third parties, such that the electronic money server can detect the presence of alteration of the transaction information based on the transaction number. Furthermore, at the time of generating a transaction number, a seed, which is time-limited secret information confidential to third parties, is inputted to the calculation rule along with the transaction information and used for calculating the transaction number, whereby it is possible to further enhance the level of security.

8 Claims, 11 Drawing Sheets

Fig. 3

| AFFILIATED STORE CODES | SEED VERSION | TIME LIMITS | SEED |
|---|---|---|---|
| 001 | 1 | 2004/4/1 | 1547896545 |
| | 2 | 2004/4/2 | 3578496214 |
| | ... | ... | ... |
| ... | ... | ... | ... |

Fig. 4

| AFFILIATED STORE CODES | ORDER NUMBERS | SETTLEMENT AMOUNTS | TRANSACTION NUMBER | ... |
|---|---|---|---|---|
| 0 0 1 | 1 2 3 4 5 | 8 0 0 | 254876584 | ... |
| ... | ... | ... | ... | ... |
| ... | ... | ... | ... | ... |

SETTLEMENT SERVER, SETTLEMENT REQUEST SERVER AND SETTLEMENT EXECUTION TERMINAL

BACKGROUND OF THE INVENTION

1. Field of the Invention

The present invention relates to a settlement server, a settlement request server and a settlement execution terminal. For example, in response to a request from the settlement request server, the settlement server makes settlement by electronic money in the settlement execution terminal.

2. Description of the Related Art

In recent years, settlement systems using electronic money have come into wide use.

The electronic money is electronic information having a monetary value, called "VALUE", which is equivalent to cash, and the electronic money is stored in an IC chip and used in the same manner as in prepaid cards by increasing/decreasing the amount of "VALUE".

For example, a contactless-type IC chip is used as the IC chip (hereinafter, referred to as the "electronic money IC chip"). The electronic money IC chip has functions of, for example, storing the "VALUE" and updating the amount of stored "VALUE" based on externally inputted amount update information, and is embedded in a cell phone or a plastic card, along with a communication antenna.

The amount of "VALUE" stored in the electronic money IC chip can be increased/decreased by using a dedicated terminal device installed in a store or the like, and it also can be increased/decreased based on amount update information transmitted via the Internet from an electronic money server operated by an electronic money business entity.

A service based on this has been proposed in which a server on the Internet (e.g., a game content sales server) requests the electronic money server to settle a payment for merchandise or service sold to a user, and the electronic money server decreases the amount of "VALUE" equivalent to the price from the user's electronic money IC chip.

By using this service, the user can settle the payment by the "VALUE" stored in the electronic money IC chip.

In addition, a business entity that entrusts the electronic money server with making settlement is referred to as an "affiliated store", which is previously registered with the electronic money business entity, and a server device by which the affiliated store sells merchandise and services is referred to as an "affiliated store server".

Such a technology for allowing the electronic money server to be entrusted with making settlement upon request from the affiliated store server is disclosed in unpublished Japanese patent application No. 2003-60522 filed by the present applicant.

The technology proposed by the above application is outlined with reference to the flowchart of FIG. 11.

Note that a cell phone as described below is capable of connecting to the Internet, and includes an electronic money IC chip, so that the electronic money server and the electronic money IC chip can communicate with each other via the Internet.

First, the user uses the cell phone to access a sales site on the affiliated store server. The sales site offers paid downloads of game content, and sells books online.

When the user selects merchandise to purchase and confirms a payment amount, the cell phone transmits an electronic mail address for the cell phone to the sales server (step 105).

The affiliated store server receives the electronic mail address from the cell phone, and transmits it to the electronic money server along with transaction information containing an affiliated store code, a settlement amount, an order number, etc., thereby entrusting the electronic money server with settling a payment (step 110).

The electronic money server receives the transaction information and the electronic mail address, and in response to this, generates (assigns) a transaction number (step 115).

Then, the electronic money server saves transaction details (the transaction information, the transaction number, the electronic mail address, etc.) into a database (step 120).

After storing the transaction details as described above, the electronic money server generates settlement start mail, and transmits it to the cell phone based on the electronic mail address received from the affiliated store server (step 125).

The settlement start mail is electronic mail for making settlement by "VALUE" stored in the cell phone, and embedded with the transaction number, for example, in the encrypted form that cannot be recognized by the user.

When the user receives the settlement start mail on the cell phone, he/she activates a mailer (an application for transmitting/receiving electronic mail) to display the settlement start mail on the cell phone's display for confirmation of details (step 130).

For example, the display presents information by which the user confirms a transaction targeted for the settlement, and a settlement start button for starting the settlement.

When the user selects the settlement start button, the cell phone connects to the electronic money server, and transmits the transaction number attached with the settlement start mail (step 135).

The electronic money server accepts the connection with the cell phone, and receives the transaction number. Then, the electronic money server identifies the settlement amount by checking the received transaction number against the transaction details previously stored in the database.

The reason why the transaction number related with the settlement amount, rather than the settlement amount itself, is transmitted to the cell phone is to prevent the settlement amount from being altered by the cell phone.

Next, the electronic money server communicates with the electronic money IC chip provided in the cell phone (the cell phone has an application provided therein for allowing the electronic money server to communicate with the electronic money IC chip), and transmits, to the electronic money IC chip, amount update information for decreasing "VALUE" by the settlement amount.

The electronic money IC chip receives the amount update information from the electronic money server to update the balance of stored "VALUE" to a value less the settlement amount, and transmits, to the electronic money server, a completion notice for notifying that the updating has been completed. Then, the electronic money server confirms, based on the completion notice, that the settlement has been completed.

In this manner, the electronic money server and the electronic money IC chip communicates with each other to perform a settlement process (step 150).

Upon confirmation that the settlement has been completed, the electronic money server transmits settlement completion mail to the cell phone (step 155).

The settlement completion mail is electronic mail for notifying that a settlement related with a transaction in question has been completed. The cell phone receives the electronic mail, and presents it on the display for confirmation by the user (step 160).

Further, the electronic money server notifies a settlement result for each transaction to the affiliated store server for confirmation by the affiliated store server (step 170).

In the above-described unpublished approach, the electronic money server performs, on a transaction-by-transaction basis, the transaction number assignment, the holding of the transaction details and the transmission of the completion notice to the affiliated store server, and therefore the number of communications and the size of information that is to be processed are significant, resulting in a considerable burden on the electronic money server.

Therefore, in order to construct a system that can be stably operated even when settlements take place at the same time, e.g., at the time of concert ticket sale, it is necessary to enhance the processing ability of the electronic money server. However, the thus-enhanced ability is not required for normal use, and such enhancement leads to an increase of the system cost.

In addition, the cell phone is required to activate the mailer upon each settlement, and for example, when settlement start mail is received while the user is playing a game, the user is required to stop playing the game. Thus, there is a need for a mechanism that is more convenient for users.

SUMMARY OF THE INVENTION

Therefore, an object of the present invention is to, in settlement by electronic money, reduce burden on the electronic money server and enhance convenience for users.

To achieve the above object, a first aspect of the present invention is directed to a settlement server for subtracting a monetary value equivalent to a settlement amount demanded by a settlement request server from a settlement execution terminal having stored a monetary value as electronic information, the settlement execution terminal increasing/decreasing the monetary value based on amount update information, the server including: a transaction information reception section for receiving, from the settlement execution terminal, transaction identification information for identifying a transaction with the settlement request server, an amount, and a calculation result for a predetermined calculation performed on the settlement amount; an amount confirmation section for performing the predetermined calculation on at least the received amount, and confirming equality between a result of the calculation and the received calculation result, thereby confirming whether the received amount and the settlement amount are equal; and an amount update information transmission section for, when the amount confirmation section determines that the received amount and the settlement amount are equal, transmitting to the settlement execution terminal amount update information for subtracting a monetary value equivalent to the received amount.

In a second aspect of the present invention, based on the first aspect, the amount confirmation section performs the predetermined calculation on the received amount and the received transaction information, and confirms equality between a result of the calculation and the received calculation result, and when a calculation result for the predetermined calculation performed on the received amount and the received transaction information is determined to be equal to the received calculation result, the amount update information transmission section transmits the amount update information to the settlement execution terminal.

In a third aspect of the present invention, based on the first or second aspect, the calculation result transmitted from the settlement execution terminal is generated by any of the settlement request server and the settlement execution terminal, a generator of the calculation result generates the calculation result based on the settlement amount as well as a predetermined value from the settlement server as a provider, and the amount confirmation section performs the calculation based on the received amount and the predetermined value.

In a fourth aspect of the present invention, based on the third aspect, the settlement server includes a predetermined value transmission section for transmitting the predetermined value with an assigned time limit to the provider.

A fifth aspect of the present invention is directed to a settlement request server for requesting a settlement server to subtract a monetary value equivalent to a settlement amount from a settlement execution terminal having stored a monetary value as electronic information, the settlement execution terminal increasing/decreasing the monetary value based on amount update information, the server including: a calculation section for performing a predetermined calculation on the settlement amount; a settlement information transmission section for transmitting transaction identification information for identifying a transaction, a settlement amount, and a calculation result by the calculation section to the settlement server via the settlement execution terminal; and a settlement completion confirmation section for confirming, based on a notice from at least one of the settlement server and the settlement execution terminal, that the monetary value stored in the settlement execution terminal is decreased by the settlement amount based on information transmitted by the settlement information transmission section.

In a sixth aspect of the present invention, based on the fifth aspect, the settlement request server stores a predetermined value provided by the settlement server, and the calculation section performs the calculation based on the settlement amount and the predetermined value.

In a seventh aspect of the present invention, based on the sixth aspect, the settlement request server includes a predetermined value reception section for receiving predetermined values, each being assigned a time limit, from the settlement server, and the calculation section performs a calculation based on a predetermined value within a time limit that is selected from among the received predetermined values.

An eighth aspect of the present invention is directed to a settlement execution terminal including: a transaction amount reception section for receiving transaction identification information for identifying a transaction and a settlement amount from the settlement request server; a calculation section for performing a predetermined calculation on the received settlement amount; a settlement information transmission section for transmitting the received transaction identification information, the settlement amount and a calculation result by the calculation section to the settlement server; an amount update information reception section for receiving from the settlement server amount update information generated based on information transmitted by the settlement information transmission section; and an amount update information input section for inputting the received amount update information to a monetary terminal having stored a monetary value as electronic information, the monetary terminal increasing/decreasing the monetary value based on the update information.

In a ninth aspect of the present invention, based on the eighth aspect, the settlement execution terminal stores a predetermined value provided by the settlement server, and the calculation section performs a calculation based on the settlement amount and the predetermined value.

In a tenth aspect of the present invention, based on the ninth aspect, the settlement execution terminal includes a predetermined value reception section for receiving predetermined values, each being assigned a time limit, from the settlement server, and the calculation section performs a calculation based on a predetermined value within a time limit that is selected from among the received predetermined values.

According to the present invention, it is possible to, in settlement by electronic money, reduce burden on the electronic money server and enhance convenience for users.

BRIEF DESCRIPTION OF THE DRAWINGS

FIG. 3 is a table illustrating a logical configuration of a seed database.

FIG. 4 is a table illustrating a logical configuration of a transaction information database.

DESCRIPTION OF THE PREFERRED EMBODIMENTS (1) Basic Configuration of the Present Embodiment In the present embodiment, the function of generating the transaction number is transferred from the electronic money server to the affiliated store server, so that the affiliated store server generates the transaction number.

The transaction number is associated with the transaction information by calculating the transaction information using a calculation rule confidential to third parties, so that the electronic money server can detect the presence of alteration of the transaction information based on the transaction number.

Further, upon generation of the transaction number, a starting value (a seed), which is time-limited secret information confidential to third parties, is inputted to the calculation rule along with the transaction information, and used for calculating the transaction number, thereby enhancing the level of security.

Figure 1:
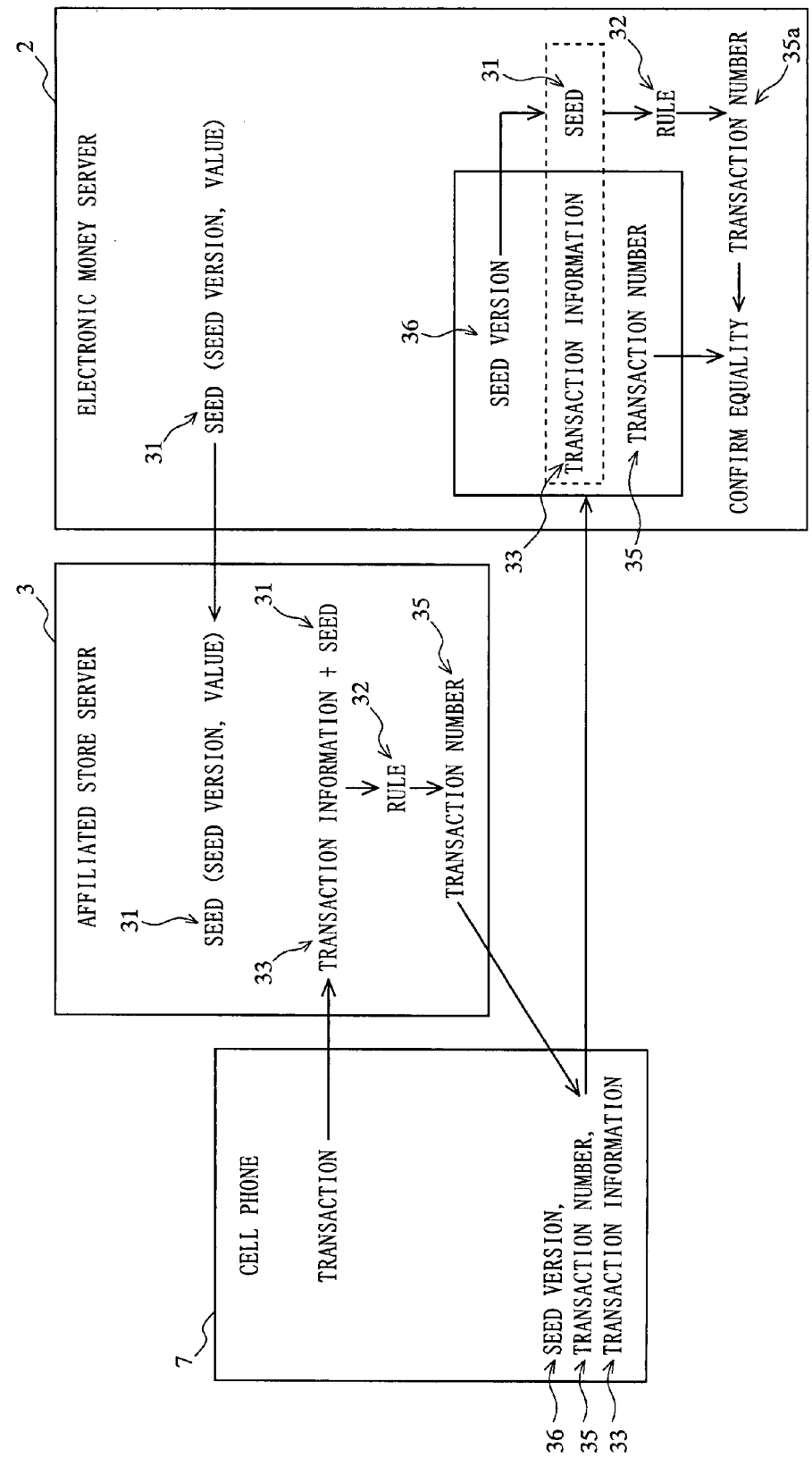
FIG. 1 is a block diagram for explaining the basic configuration of an embodiment.

FIG. 1 is a block diagram for explaining the basic configuration of the present embodiment.

First, an electronic money server 2 passes to an affiliated store server 3 a calculation rule 32 for calculating the transaction number, and a seed 31, which is a predetermined value used for calculating the transaction number. The seed is kept confidential to third parties.

Also, it is desirable that the contents of the calculation rule 32 are kept confidential to the affiliated store server 3. For example, it is particularly effective to use a one-way function, e.g., a hash function, as the calculation rule 32 because the one-way function makes it difficult to inversely calculate the transaction information, which is an input value, based on the transaction number, which is a calculation result.

A time limit is set for the seed 31, and the seed 31 is provided regularly, e.g., once a day, or may be provided irregularly from the electronic money server 2 to the affiliated store server 3. As such, the electronic money server 2 includes a predetermined value (seed) transmission section, and the affiliated store server 3 includes a predetermined value reception section.

The seed 31 is composed of a seed version, which is information for identifying the version of the seed 31, and a value (e.g., a numerical value), which is the main body of the seed 31.

The seed 31 is provided as a different value for each affiliated store server 3 (although only one server is shown in FIG. 1, there may be a plurality of such servers) in order to enhance the level of security.

When the user uses the cell phone 7 to propose a transaction (purchase of merchandise or service) to the affiliated store server 3 provided with the seed 31 and the calculation rule 32 from the electronic money server 2 as described above, the affiliated store server 3 inputs, to the calculation rule 32, transaction information 33 (an affiliated store code, an order number, a settlement amount, etc.) and the seed 31 to generate a transaction number 35.

Then, the affiliated store server 3 transmits a seed version 36 of the seed 31, the transaction number 35 and the transaction information 33 to the cell phone 7.

Upon receipt of these pieces of information from the affiliated store server 3, the cell phone 7 connects to the electronic money server 2, and transmits the pieces of information to the electronic money server 2.

When the electronic money server 2 receives the pieces of information from the cell phone 7, the electronic money server 2 identifies the seed 31 based on the affiliated store code contained in the transaction information and the seed version, and acquires the identified seed 31 from a seed database having seeds stored therein.

As will be described later, the electronic money server 2 has stored in the seed database combinations of affiliated store codes and seed versions in association with the seeds.

The electronic money server 2 has stored therein the calculation rule 32 provided to the affiliated store server 3, and calculates a transaction number 35a by inputting the identified seed 31 and the transaction information 33, which has been received from the cell phone 7, to the calculation rule 32.

Then, the electronic money server 2 checks equality between the transaction number 35a and the transaction number 35 received from the cell phone 7.

If they are equal, the transaction information received from the cell phone 7 is considered as valid, whereas if they are not equal, the transaction information is considered as invalid (e.g., it has been altered by the cell phone 7).

After checking the validity of the transaction information as described above, the electronic money server 2 transmits, to the cell phone 7, amount update information for decreasing the amount of VALUE by the settlement amount to cause the cell phone 7 to decrease the amount of VALUE.

In the present embodiment, the transaction number is generated in the affiliated store server 3 as described above, and therefore it is possible to reduce the number of communications by the electronic money server 2 as well as the burden on the electronic money server 2.

As will be described later, settlement results are collectively reported from the electronic money server 2 to the affiliated store server 3 by batch processing, and therefore it is possible to further reduce the number of communications by the electronic money server 2.

Furthermore, no electronic mail is used for settlement, and therefore the user is able to smoothly carry out a process from confirmation of a transaction to the settlement without requiring the cell phone 7 to activate the mailer.

(2) Details of the Embodiment

Figure 2:
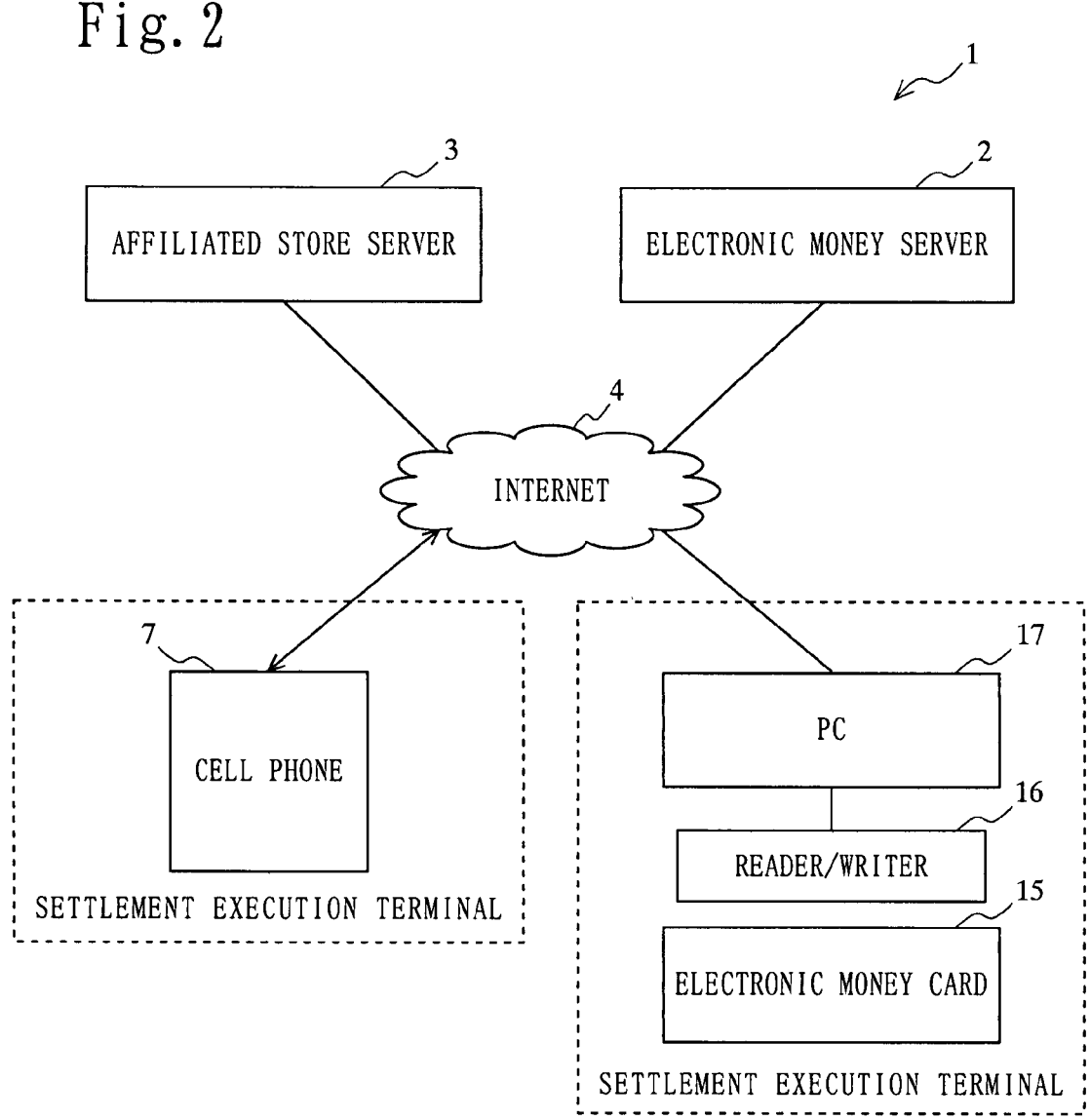
FIG. 2 is a block diagram schematically illustrating a configuration of a settlement system in the embodiment.

FIG. 2 is a block diagram schematically illustrating a configuration of a settlement system in the present embodiment.

In the settlement system 1, the electronic money server 2, the affiliated store server 3, the cell phone 7 and a PC 17 are provided so as to be connectable with each other via the Internet 4.

The cell phone 7 performs wireless communication with an unillustrated base station via which the cell phone 7 connects to the Internet 4.

In addition, the PC 17 includes a reader/writer 16 as a peripheral device, so that it can perform short-range wireless communication with an electronic money card 15.

The cell phone 7 includes an electronic money IC chip, and the user can make settlement by VALUE stored in the electronic money IC chip. As such, the cell phone 7 constitutes a settlement execution terminal.

Furthermore, the electronic money card 15 also includes an electronic money IC chip, and therefore the settlement can be made by VALUE stored in this electronic money IC chip.

The electronic money card 15 connects to the PC 17 via the reader/writer 16 so as to become accessible from the electronic money server 2, and in this case, the PC 17 connected with the electronic money card 15 also constitutes a settlement execution terminal.

As such, the user can make settlement using any of the cell phone 7 and the electronic money card 15, and therefore the cell phone 7 and the PC 17 having the electronic money card 15 placed therein are hereinafter referred to as the "settlement execution terminals" unless there is a particular need to distinguish between them.

The affiliated store server 3 operates a sales site for selling merchandise and services to users, and the users can access the sales site from the cell phone 7 or the PC 17 to purchase the merchandise and services.

Although only one affiliated store server 3 is shown in FIG. 2, there can be a plurality of affiliated store servers 3, each being assigned an affiliated store code for identification.

Also, as the settlement execution terminals, only one cell phone 7 and one PC 17 are shown, but there can be a plurality of such phones and PCs.

The affiliated store server 3 requests the electronic money server 2 to settle a payment for a transaction. In response to the request, the electronic money server 2 subtracts the amount of VALUE equivalent to the settlement amount from the amount of VALUE stored in the cell phone 7 or the electronic money card 15.

As such, the affiliated store server 3 constitutes a settlement request server for requesting settlement, and the electronic money server 2 constitutes a settlement server for executing a settlement process. Furthermore, the cell phone 7 constitutes a settlement execution terminal.

The electronic money business entity that operates the settlement system 1 transfers money corresponding to the subtracted VALUE to a financial account of the affiliated store at a later date.

Thus, the movement of VALUE is related with the movement of actual money, so that the affiliated store can collect the payment amount.

In addition, a process for increasing the amount of VALUE stored in the cell phone 7 and the electronic money card 15 is called "charging up", and at the time of charging up, the electronic money business entity collects money equivalent to the amount of increased VALUE.

In this manner, by moving actual money in relation with VALUE, it is made possible to allow the VALUE to have an exchangeable value similar to money, and circulate it in the market.

Hereinbelow, each component of the settlement system 1 will be described.

The electronic money server 2 is a server device entrusted with settling a payment in response to a request from the affiliated store server 3.

The electronic money server 2 has a seed management function, a transaction acceptance function, a settlement function, a settlement result notification function, and so on.

[Seed Management Function]

The electronic money server 2 manages seeds used by affiliated store servers 3 for generating transaction numbers.

FIG. 3 illustrates an exemplary logical configuration of a seed database for the electronic money server 2 to manage the seeds.

The seed database contains fields such as "affiliated store codes", "seed versions", "time limits" and "seeds".

The "affiliated store codes" refer to pieces of information assigned to affiliated stores that operate their affiliated store servers 3 in order to identify the requesters (affiliated stores) of entrusted settlement.

The "seed versions" refer to version numbers of the seeds. The seed versions are numbered in increasing order as the seed becomes newer.

As shown in FIG. 3, the seed database presents a list, by affiliated store codes, of seeds provided to the affiliated store servers 3, and furthermore, the seeds are identifiable with reference to the seed versions.

In the present embodiment, the seeds are identifiable as described above based on combinations of their affiliated store codes and seed versions, but the seeds may be identified based on other identification information.

For example, by assigning serial numbers to all the seeds, it is possible to identify the seeds with the serial numbers.

The "time limits" refer to time limits of the seeds. In the present embodiment, the seeds are generated once per day, and provided to the affiliated store servers 3, and their time limits are set to the end of the issuance date.

When confirming a transaction number received from an affiliated store server 3, the electronic money server 2 confirms the time limit of a seed used for generating the transaction number, and if the seed used by the affiliated store server 3 is beyond the time limit, no settlement process is performed.

By providing different seeds to the affiliated store server 3 on a daily basis as described above, it is made possible to limit any damage that might be caused by, for example, leakage of a seed within a time period in which the seed is valid, whereby it is possible to enhance the level of security.

The "seeds" refer to the main bodies of the seeds, which are composed of, for example, random numbers. By composing the seeds of random numbers, it is made difficult for third parties to infer the seeds, whereby it is possible to enhance the level of security. The affiliated store server 3 calculates the transaction numbers by inputting the seeds to a calculation rule.

In addition, the electronic money server 2 provides different seeds for each affiliated store, and updates the seed database on a daily basis.

As such, by issuing the seeds for each affiliated store, it is made possible to, even if any seed is leaked from any affiliated store, limit damage within that affiliated store.

[Transaction Acceptance Function]

The electronic money server 2 accepts connection from settlement execution terminals to receive transaction information, transaction numbers and seed versions, and store them into a transaction information database.

In the present embodiment, when a settlement execution terminal proposes a transaction to the affiliated store server 3, the settlement execution terminal transmits transaction information, a transaction number and a seed version.

All these pieces of information that have been transmitted from the affiliated store server 3 to the settlement execution terminal are transferred from the cell phone 7 to the electronic money server 2.

The transaction information contains information such as an affiliated store code, an order number and a settlement amount.

FIG. 4 is a table illustrating an exemplary logical configuration of the transaction information database.

As shown in the figure, the transaction information database contains fields such as "affiliated store codes", "order numbers", "settlement amounts" and "transaction numbers".

The "affiliated store codes" refer to affiliated store codes assigned to affiliated stores on the affiliated store servers 3.

The "order numbers" refer to transaction identification information assigned by the affiliated store server 3 such that the affiliated store server 3 can identify a transaction targeted for settlement.

The "settlement amounts" refer to amounts of money that affiliated store servers 3 entrusts the electronic money server 2 with making settlement. The electronic money server 2 generates amount update information for updating VALUE to a value less the settlement amount, and transmits it to the settlement execution terminal.

The "transaction numbers" refer to calculation results obtained by the affiliated store servers 3 calculating the transaction information and the seeds in accordance with the calculation rules provided by the electronic money server 2 (the electronic money business entity).

Although not shown in the figure, it is also possible to store seed versions transmitted from settlement execution terminals into the transaction information database in association with the transaction information.

Furthermore, it is also possible to set, in the transaction information database, flag information for confirming whether settlements have been completed on a transaction-by-transaction basis. The flag information is set as "unsettled" for a pre-settlement transaction, and "settled" for a post-settlement transaction.

The flag information allows the electronic money server 2 to confirm whether transactions are unsettled or settled.

Furthermore, it is also possible to record for each transaction the date and time of access from the settlement execution terminal and the date and time of completion of settlement.

As will be described later, the electronic money server 2 receives a date and time range designation from the affiliated store server 3 approximately once per day, and collectively transmits settlement completion notices within the designated range to the affiliated store server 3. In this case, it is possible to extract a transaction targeted for a settlement completion notice based on the date and time of settlement.

[Settlement Function]

The electronic money server 2 registers the transaction information, the transaction number, and the seed version with the transaction database, and thereafter, as illustrated in FIG. 1, determines whether the transaction information has been altered based on the transaction number, the seed, and a predetermined calculation rule.

If it is determined that the transaction information has not been altered, the electronic money server 2 starts communicating with the electronic money IC chip in the settlement execution terminal, and decreases VALUE by the following settlement process.

First, the electronic money server 2 acquires from the settlement execution terminal a monetary terminal ID and a current balance of VALUE, which are stored in the electronic money IC chip.

As will be described below, the electronic money IC chip constitutes a monetary terminal provided with a VALUE storing function, a VALUE amount updating function, a communication function, and so on, and in the settlement system 1, the electronic money IC chip is identified by the monetary terminal ID.

If the balance of VALUE is smaller than a settlement amount, an error message is transmitted to the cell phone 7 to notify as such.

If the settlement amount is within the balance of VALUE, the electronic money server 2 generates amount update information for updating the balance of VALUE to a value less the settlement amount, and transmits it to the settlement execution terminal.

When the balance of VALUE is decreased based on the amount update information, the settlement execution terminal transmits to the electronic money server 2 a completion notice indicating as such, and therefore the electronic money server 2 is able to confirm, based on the notice, that the VALUE has been decreased in the cell phone 7.

[Settlement Result Notification Function]

The electronic money server 2 reports settlement results regularly, e.g., approximately once per day, or may report the results irregularly, in accordance with a request from the affiliated store server 3.

The electronic money server 2 receives an affiliated store ID and a date and time range designation from the affiliated store server 3, and transmits to the affiliated store server 3 settlement results for corresponding transactions from the transaction database.

In this manner, the electronic money server 2 collectively reports all transaction results at one time to the affiliated store server 3 by batch processing, rather than delivering a report upon each settlement, and therefore it is possible to reduce a burden related to reporting of settlement results.

Figure 5:
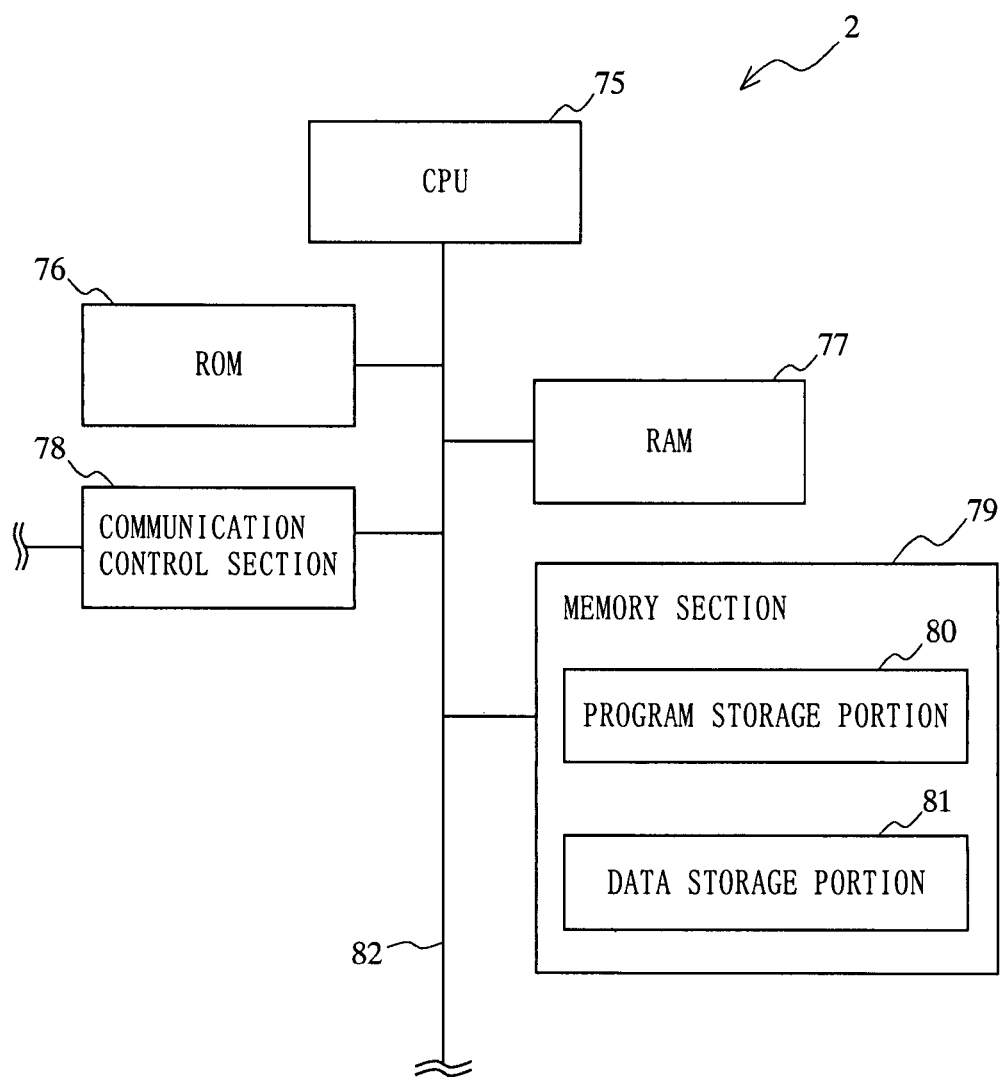
FIG. 5 is a block diagram illustrating a hardware configuration of an electronic money server.

FIG. 5 is a block diagram illustrating an exemplary hardware configuration of the electronic money server 2.

As shown in the figure, the electronic money server 2 includes a central processing unit (CPU) 75, a read only memory (ROM) 76, a random access memory (RAM) 77, a communication control section 78, and a memory section 79.

The CPU 75 is a central processing unit that performs a variety of types of information processing in accordance with programs stored in the ROM 76 and the memory section 79.

The information processing performed by the CPU 75 includes the above-described seed management function, transaction acceptance function, settlement function, and settlement result notification function.

The ROM 76 is a read-only memory having stored therein a program, data and parameters that are essential to the operation of the electronic money server 2.

The RAM 77 is a memory to/from which the CPU 75 can perform writing and reading. The RAM 77 provides a working area for the CPU 75 to carry out each of the above functions.

The memory section 79 is composed of a high-capacity memory device, such as a hard disk, in which a program storage portion 80 and a data storage portion 81 are formed.

The program storage portion 80 has stored therein a program for causing the CPU 75 to implement each of the above functions related to entrusted settlement as well as an operating system (OS), which is a basic program for operating the electronic money server 2.

In the data storage portion 81, the seed database, the transaction information database, and other databases and data are formed.

The other databases and data include an affiliated store registration database for registering affiliated stores, a user registration database for registering users, and log data in which communication details of affiliated store servers 3 and settlement execution terminals are recorded.

The communication control section 78 is an interface for communicating with the electronic money server 2, the settlement execution terminals, etc., via the Internet 4.

The affiliated store server 3 (FIG. 2) will now be described.

The affiliated store server 3 is a web server for operating a sales site on the Internet 4.

The affiliated store server 3 has various functions such as a seed acquisition function, a merchandise selling function, a transaction information generation function, a transaction number generation function, an entrusted settlement request function, a settlement result confirmation function 1, and a settlement result confirmation function 2.

[Seed Acquisition Function]

The affiliated store server 3 receives a seed from the electronic money server 2 approximately once per day, along with a seed version, and stores them. This process is performed when the time limit of a currently stored seed is expired.

When a new seed is transmitted from the electronic money server 2, the seed that has been stored previously is updated to the newly received seed.

In this manner, the affiliated store server 3 is able to always hold a seed that is within its time limit.

[Merchandise Selling Function]

The affiliated store server 3 sells merchandise and services at a sales site. Users are able to access the sales site on the affiliated store server 3 by inputting a predetermined uniform resource locator (URL) from the cell phone 7 or the PC 17.

At the sales site, a variety of types of merchandise and services are available, e.g., paid downloads of game content, movie content, music content, and computer programs, as well as merchandise such as books and stationery, which are placed on order at the site and delivered to the users at a later time.

The users can access the sales site from the settlement execution terminals to view the merchandise and services and make a proposal to purchase them.

[Transaction Information Generation Function]

When the user selects merchandise or service to purchase at the sales site, and makes a proposal to purchase it, the affiliated store server 3 generates transaction information concerning the transaction.

The transaction information contains pieces of information, such as an affiliated store code, a settlement amount, and an order number, which are required for the electronic money server 2 to perform an entrusted settlement, and the transaction information is transmitted to the electronic money server 2 via the settlement execution terminal as will be described later.

The affiliated store server 3 stores the transaction information into the sales database, and at this time, also stores other additional information, including a user ID (this is on the premise that the user has previously completed user registration and the user ID has already been issued by the affiliated store server 3), the date and time of purchase proposal, etc.

The affiliated store server 3 manages information concerning business transactions at the sales site by storing it into the sales database.

[Transaction Number Generation Function]

The affiliated store server 3 has been previously assigned a calculation rule by the electronic money business entity, and has stored it therein.

The calculation rule is a calculation expression or algorithm that calculates a transaction number using the transaction information and the seed as input values.

After generating the transaction information, the electronic money server 2 inputs it to the calculation rule, along with the seed, to calculate the transaction number.

[Entrusted Settlement Request Function]

After generating the transaction information and the transaction number, the electronic money server 2 transmits them to the settlement execution terminal along with a seed version.

These pieces of information are automatically transferred from the settlement execution terminal to the electronic money server 2, thereby requesting the electronic money server 2 to perform an entrusted settlement.

[Settlement Result Confirmation Function 1]

When settlement by VALUE is performed between the electronic money server 2 and the settlement execution terminal, the affiliated store server 3 receives a settlement completion notice indicating a completion of the settlement from the settlement execution terminal.

In this manner, the settlement execution terminal transmits the settlement completion notice to the affiliated store server 3 upon each completion of settlement by VALUE, so that the affiliated store server 3 can confirm that processing related to a transaction has been completed on the settlement terminal side. Then, the affiliated store server records a completion of the processing on the settlement terminal side to the sales database.

[Settlement Result Confirmation Function 2]

The affiliated store server 3 requests the electronic money server 2 to transmit a settlement result by transmitting thereto an affiliated store ID and a date and time range designation approximately once per day.

Then, the affiliated store server 3 compares the settlement result transmitted by the electronic money server 2 with information recorded in the sales database to check whether the result matches the settlement completion notice received from the settlement execution terminal.

The hardware configuration of the affiliated store server 3 is basically the same as that of electronic money server 2 shown in FIG. 5.

The affiliated store server 3 has stored in the program storage portion 80 a program for causing the CPU 75 to carry out various functions such as the seed acquisition function, the merchandise selling function, the transaction information generation function, the transaction number generation function, the entrusted settlement request function, the settlement result confirmation function 1 and the settlement result confirmation function 2.

In addition, the data storage portion 81 has stored therein the seed, the calculation rule, the sales database and so on.

The cell phone 7 will now be described.

Figure 6:
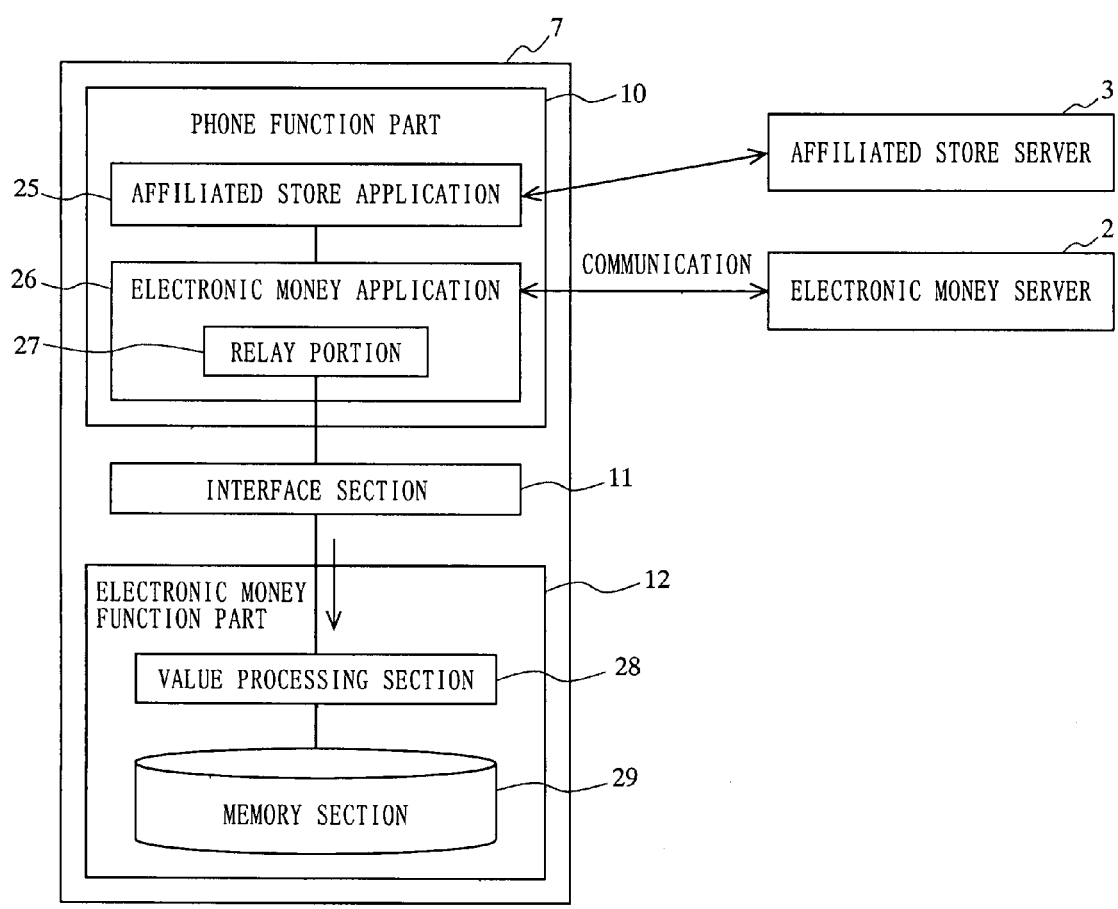
FIG. 6 is a block diagram illustrating a functional configuration of a cell phone.

FIG. 6 is a block diagram illustrating a functional configuration of the cell phone 7. As shown in FIG. 6, the cell phone 7 includes a phone function part 10, which carries out a function as an Internet-connectable cell phone, an electronic money function part 12, which is composed of an electronic money IC chip and carries out an electronic money processing function, and an interface section 11 for connecting the both parts.

The cell phone 7 constitutes a settlement execution terminal in which the electronic money function part 12 constitutes a monetary terminal. The electronic money function part 12 may be removable from the cell phone 7.

In addition, the cell phone 7 includes a display for displaying a screen provided by the sales site as well as including character keys, numerical keys, operation keys, etc., so that the user can input a variety of types of information (e.g., the user can confirm a payment amount for a purchase of merchandise).

The phone function part 10 is capable of performing wireless communication with a base station to connect via the base station to a telephone line network (to make a telephone call) or to the Internet 4 (to access the electronic money server 2 or the affiliated store server 3).

The phone function part 10 has incorporated therein an affiliated store application 25 for accessing sales sites on affiliated store servers 3 and an electronic money application 26 for accessing the electronic money function part 12.

The affiliated store application 25 is an application for purchasing merchandise and services at the sales sites. When the user proposes purchase of merchandise or service, the affiliated store server 3, in response to this proposal, transmits transaction information, a transaction number and a seed version, and the affiliated store application 25 receives these pieces of information and transfers them to the electronic money server 2 while passing the transaction information as an argument to the electronic money application 26.

The transaction information passed as an argument is used by the electronic money application 26 for transmitting a settlement completion notice to the affiliated store server 3 after settlement is completed.

The electronic money application 26 is an application capable of communicating with the electronic money server 2 to operate the electronic money function part 12, and includes a relay portion 27 for accessing the electronic money function part 12 via the interface section 11.

Upon receipt of the transaction information as an argument from the affiliated store application 25, the electronic money application 26 temporarily stores it and connects to the electronic money server 2.

Then, the electronic money application 26 reads pieces of information, such as a monetary terminal ID and a VALUE balance, which are stored in the electronic money function part 12, and transmits them to the electronic money server 2.

Further, the electronic money application 26 receives amount update information, which is transmitted from the electronic money server 2 in response to the transmitted information, and inputs it to the electronic money function part 12.

The electronic money function part 12 is composed of an electronic money IC chip in which unillustrated elements such as a CPU, a ROM, a RAM, a memory section, and a terminal communication section are formed, and executes a VALUE processing program in the CPU, thereby forming a VALUE processing section 28 shown in FIG. 6.

The VALUE processing section 28 accepts an input of the amount update information, and updates the amount of VALUE stored in the memory section 29 to an amount specified by the amount update information.

More specifically, the amount update information can be an addition or subtraction command to add/subtract the specified amount to/from the amount of VALUE, for example.

In this a case, the VALUE processing section 28 executes the command to add/subtract the specified amount to/from the amount of VALUE.

In the case of performing a settlement process, the electronic money server 2 generates a subtraction command to subtract an amount of VALUE equivalent to a settlement amount, and inputs it to the VALUE processing section 28 via the electronic money application 26, thereby decreasing the balance of VALUE by the settlement amount.

In another example, the amount update information may be an updated amount, and the VALUE processing section 28 may rewrite the balance of VALUE to an amount specified by the amount update information.

In this case, the electronic money server 2 generates amount update information for specifying an amount obtained by subtracting the amount of settlement from the balance of VALUE stored in the memory section 29, and inputs it to the VALUE processing section 28 via the electronic money application 26.

The VALUE processing section 28 rewrites the balance of VALUE stored in the memory section 29 to the amount specified by the amount update information.

The memory section 29 is composed of, for example, an EEPROM, and has stored therein a monetary terminal ID, a VALUE balance, log data, etc.

The VALUE processing section 28 is capable of increasing/decreasing the balance of VALUE stored in the memory section 29 based on the amount update information, as well as outputting the balance of VALUE and the monetary terminal ID to the electronic money application 26.

While the present embodiment has been described with respect to the case where the electronic money function part 12 is included in the cell phone 7 to constitute a settlement execution terminal, the electronic money function part 12 may be incorporated in another portable terminal device connectable to the Internet 4, e.g., a personal digital assistant (PDA) or a portable game device, to constitute a settlement execution terminal.

The PC 17 will now be described with reference to FIG. 7. The PC 17 can be composed of a personal computer connectable to the Internet 4, for example. It is also possible to use terminal devices other than the personal computer, e.g., a set-top box and a game device.

Figure 7:
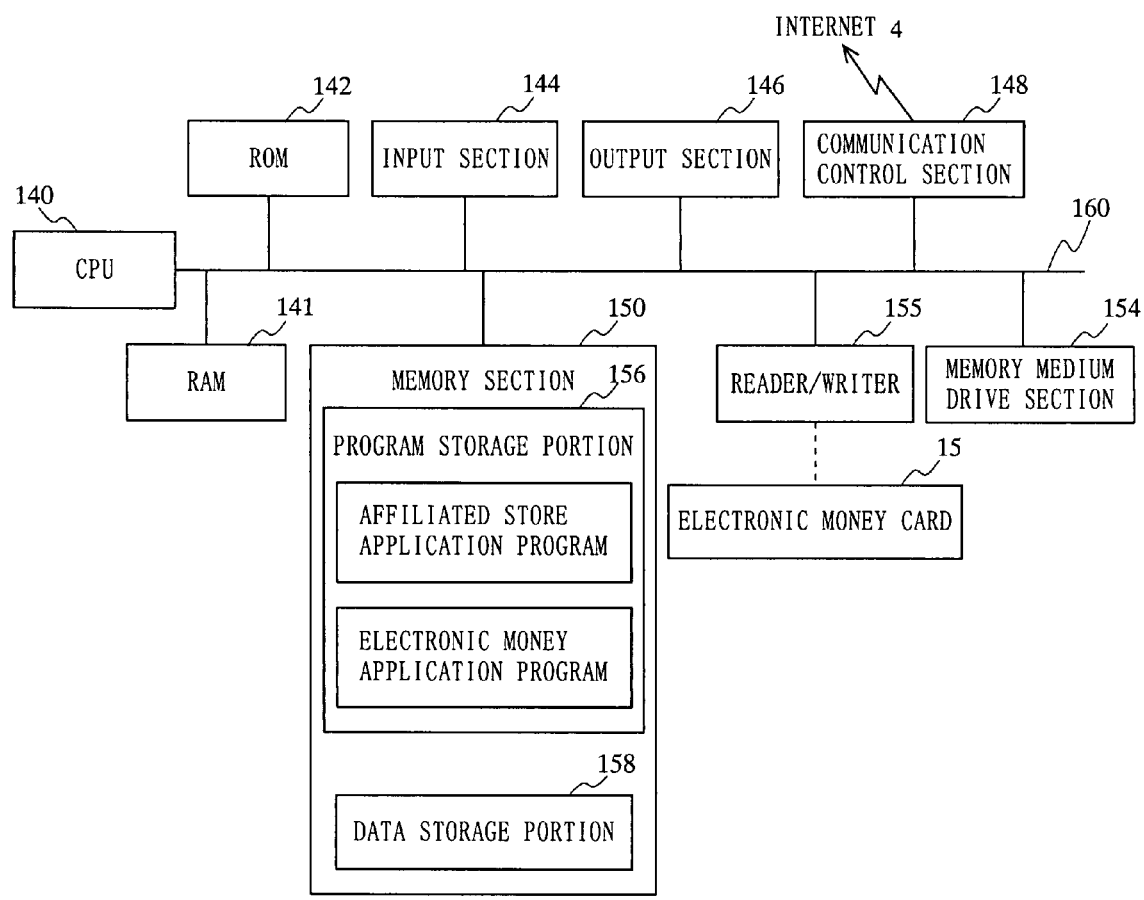
FIG. 7 is a block diagram illustrating a hardware configuration of a PC.

As shown in FIG. 7, the PC 17 includes a CPU 140, a ROM 142, a RAM 141, an input section 144, an output section 146, a communication control section 148, a memory section 150, a reader/writer 155, and a memory medium drive section 154, which are connected via a path line 160.

The CPU 140 is a central processing unit for performing a variety of types of information processing in accordance with programs stored in the ROM 142 and the memory section 150.

The information processing performed by the CPU 140 includes a function of accessing affiliated store servers 3 to use services provided at sales sites and a function, to be described later, of accessing the electronic money card 15 via the reader/writer 155 and accessing the electronic money server 2 to mediate communication between the electronic money server 2 and the electronic money card 15.

The ROM 142 is a read-only memory having stored therein a program, data and parameters that are essential to the operation of the electronic money server 2.

The RAM 141 is a memory to/from which the CPU 140 can perform writing and reading. The RAM 141 provides a working area for the CPU 140 to carry out each of the above functions.

The memory section 150 is composed of, for example, a high-capacity storage device, such as a hard disk, in which a program storage portion 156 and a data storage portion 158 are formed.

The program storage portion 156 has stored therein an affiliated store application program for causing the CPU 140 to carry out the function of using services provided at sales sites, and an electronic money application program for causing the electronic money server 2 and the electronic money card 15 to process VALUE therebetween.

By executing these programs with the CPU 140, the affiliated store application and the electronic money application are implemented in a manner similar to the affiliated store application 25 and the electronic money application 26 of the cell phone 7.

In addition, the program storage portion 156 has stored therein an operating program (OS), which is a basic program for operating the PC 17.

The data storage portion 158 has stored therein a variety of types of data including communication log data, for example.

The input section 144 includes input devices such as a keyboard and a mouse, and the user can input a variety of types of data by operating these devices.

The user can select merchandise and services at sales sites or propose settlement by operating these input devices.

The output section 146 includes output devices such as a display and a printer.

The display presents a screen for a sales site to provide services, and the user inputs information through the input section 144 with reference to displayed contents on the screen to use a service provided by the sales site.

The communication control section 148 is an interface for communicating with the electronic money server 2, the affiliated store server 3, etc., via the Internet 4.

The memory medium drive section 154 drives removable memory media, such as a magnetic disc, a magneto-optical disc and a semiconductor memory device, to read information stored in such memory media and, if the memory media are compatible with writing, write information to the memory media.

In the case where the electronic money application program, the affiliated store application and other programs are stored in the memory media, these programs can be read from the memory medium drive section 154 and installed to the memory section 150.

The reader/writer 155 is a relay device for mediating communication between the CPU 140 and the electronic money card 15.

As will be described later, the electronic money IC chip provided in the electronic money card 15 is a contactless-type IC chip adapted to perform short-range wireless communication.

The reader/writer 155 includes an antenna for performing wireless communication with the electronic money card 15, and uses the antenna to transmit/receive signals to/from the electronic money card 15.

In addition, power to drive the electronic money card 15 is wirelessly supplied from the reader/writer 155.

Figure 8:
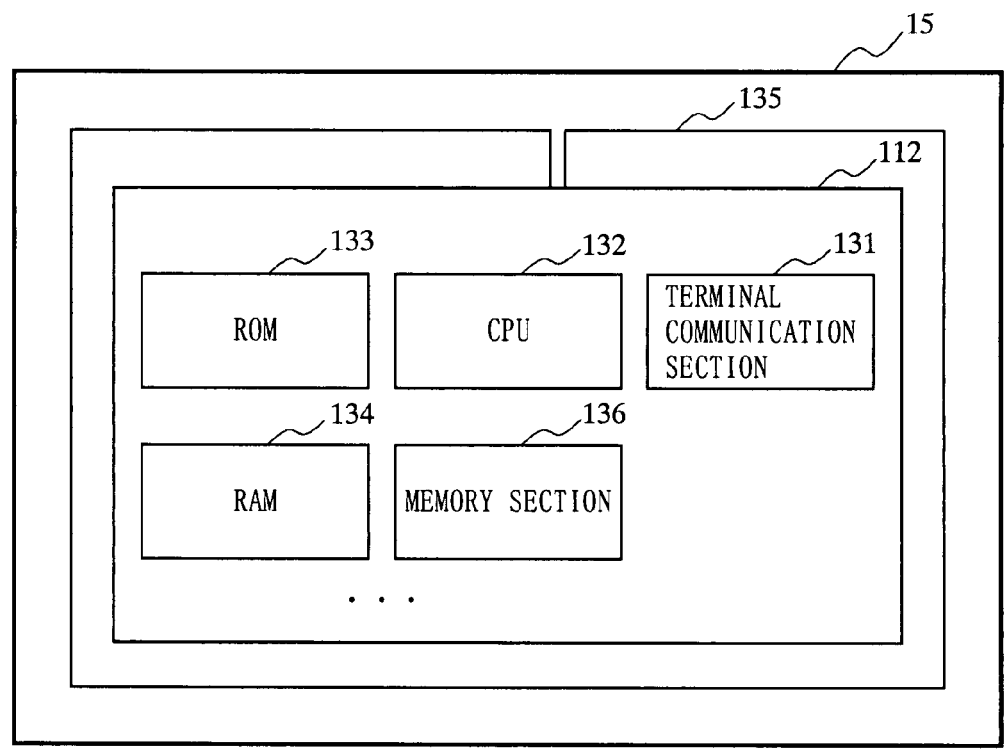
FIG. 8 is a block diagram illustrating a hardware configuration of an electronic money card.

Next, the configuration of the electronic money card 15 is described with reference to FIG. 8. The electronic money card 15 is a monetary terminal for storing "VALUE" and increasing/decreasing the amount of "VALUE" based on amount update information, and the electronic money card 15 is composed of card-shaped synthetic resin embedded with an electronic money IC chip 112 and an antenna 135 for connecting thereto as shown in FIG. 8.

The antenna 135 has a function for generating power from radio waves emitted by the reader/writer 155 and supplying the power to the electronic money IC chip 112, and a function of performing short-range wireless communication with the reader/writer 155 (FIG. 7).

The electronic money IC chip 112 is composed of a contactless-type IC chip on which a CPU 132, a ROM 133, a RAM 134, a memory section 136, a terminal communication section 131, etc., are formed.

Note that the cell phone 7 also has embedded therein an IC chip that is similar to the electronic money IC chip 112 and constitutes an electronic money function part 12.

The CPU 132 is a central processing unit for executing a VALUE processing program stored in the memory section 136 to cause the electronic money card 15 to carry out an electronic money processing function.

Thus, the CPU 132 can update the amount of stored "VALUE" based on amount update information received from the electronic money server 2.

The memory section 136 is a readable/writable memory having stored therein a variety of types of programs and data. Information stored in the memory section 136 can be held even when no power is supplied to the electronic money IC chip 112, and is composed of an Electrically Erasable and Programmable ROM (EEPROM), for example.

The programs stored in the memory section 136 include a VALUE processing program and an operating system (OS), which is a basic program for causing the electronic money IC chip 112 to function.

In addition, the data stored in the memory section 136 include a monetary terminal ID, a current balance of VALUE, and communication log data.

The ROM 133 is a read-only memory having stored therein programs and data that are essential for causing the electronic money IC chip 112 to function.

The RAM 134 is a readable/writable memory for providing a working area for the CPU 132 to carry out the VALUE processing function.

In addition, the terminal communication section 131 is an interface connected with the antenna 135 to communicate with the reader/writer 155, etc.

The procedure by an entrusted electronic money server 2 in the settlement system 1 as configured above for settling a payment demanded by the affiliated store server 3 is described with reference to a flowchart in FIG. 9.

In the below-described operation of the settlement execution terminal, steps 5 to 25 and step 55 are each performed by the affiliated store application, and steps 40 and 45 are performed by the electronic money application.

First, the user uses a service provided by the sales site with the settlement execution terminal to propose purchase of merchandise or service.

When the user makes a proposal to purchase, the affiliated store server 3 presents a settlement amount with the settlement execution terminal, and demands to confirm that the settlement amount is paid by "VALUE".

When it is confirmed that the user pays the settlement amount by "VALUE" (step 5), the affiliated store server 3 generates transaction information, and assigns the transaction information and a seed to a calculation rule to generate a transaction number (step 10).

This is performed by a calculation section provided in the affiliated store server 3.

Next, the affiliated store server 3 transmits, to the settlement execution terminal, the transaction information, the generated transaction number, and a seed version of the seed used for generating the transaction number (step 15).

Here, the transaction information, the generated transaction number, and the seed version of the seed used for generating the transaction number constitute settlement information used by the electronic money server 2 for making settlement, and the transaction information constitutes transaction identification information for identifying the transaction. The affiliated store server 3 includes a settlement information transmission section for transmitting the settlement information.

In addition, when the transaction is identifiable based on the transaction number, the transaction number may be considered as transaction identification information.

Upon receipt of these pieces of information from the affiliated store server 3, the settlement execution terminal displays a settlement acceptance screen on the display of the settlement execution terminal (step 20).

On the settlement acceptance screen, the transaction information (an affiliated store code, an order number, a settlement amount, etc.) and other items to be confirmed are displayed, and the user reconfirms the details of settlement before executing settlement.

In addition, when the settlement execution terminal is a PC 17, it is possible to cause the user to check whether the settlement execution terminal is in a state capable of connecting to the electronic money card 15 by providing an instruction such as "Please place an electronic money card in the reader/writer", for example.

After the user confirms settlement by "VALUE", the settlement execution terminal connects to the electronic money server 2, and transmits thereto the transaction information, the transaction number and the seed version that have been received from the affiliated store server 3 (step 25).

This is performed by a settlement information transmission section provided in the settlement execution terminal.

At this time, the affiliated store application passes the transaction information as an argument to the electronic money application.

Upon receipt (at a transaction information reception section) of the transaction information, the transaction number and the seed version from the settlement execution terminal, the electronic money server 2 records them to the transaction information database (FIG. 4), and verifies the transaction number (step 30).

More specifically, the verification is performed as described below. First, the electronic money server 2 checks a combination of the seed version and an affiliated store ID contained in the transaction information against the seed database (FIG. 3), and identifies the seed used by the affiliated store server 3 for generating the transaction number.

After confirming that the identified seed is within its time limit, the electronic money server 2 then calculates the seed and the transaction information received from the affiliated store server 3 in accordance with the same calculation rule as that for the affiliated store server 3. Whether the calculation result is equal to the transaction number is determined, and if they are equal, it is confirmed that the transaction information has not been altered.

Based on the fact that the transaction information has not been altered, the electronic money server 2 can confirm (by an amount confirmation section) that an amount contained therein also has not been altered.

After confirming by verification of the transaction number that the transaction information is valid, the electronic money server 2 communicates with the settlement execution terminal, and performs a settlement process (step 40).

This is performed by an amount update information transmission section provided in the electronic money server 2.

The settlement process is performed, for example, in the following manner.

First, the settlement execution terminal transmits to the electronic money server 2 the terminal ID and the VALUE balance that are stored in the electronic money IC chip.

The electronic money server 2 compares the VALUE balance with the settlement amount, and if the VALUE balance is less than the settlement amount, the electronic money server 2 transmits an error message to the settlement execution terminal to terminate the settlement process.

If the VALUE balance is more than the settlement amount, the electronic money server 2 generates amount update information for subtracting an amount of VALUE equivalent to the settlement amount, and transmits it to the settlement execution terminal.

The settlement execution terminal receives the amount update information (at an amount update information reception section), and inputs it to the electronic money IC chip (by an amount update information input section), thereby updating the amount of stored VALUE to an amount less the settlement amount.

Then, the settlement execution terminal transmits to the electronic money server 2 a completion notice indicating that updating of the amount has been completed.

The electronic money server 2 confirms, based on the completion notice, that the settlement process has been completed, and stores log data assigned the terminal ID.

After completing the settlement process, the settlement execution terminal connects to the affiliated store server 3, and transmits a settlement completion notice (step 45).

The settlement completion notice contains as an argument the transaction information received from the affiliated store application, which allows the affiliated store server 3 to identify the transaction targeted for the settlement.

The affiliated store server 3 receives the settlement completion notice from the transaction execution terminal to confirm that the settlement has been completed, and transmits a transaction result to the settlement execution terminal (step 50).

The settlement execution terminal receives the transaction result from the affiliated store server 3, and displays a transaction completion screen on the display based on the received result (step 55).

In addition, the affiliated store server 3 regularly, or irregularly, communicates with the electronic money server 2 to confirm settlement results (step 60).

At this time, the affiliated store server 3 transmits the affiliated store ID and a date and time range designation to the electronic money server 2, and the electronic money server 2 transmits any settlement result corresponding to them to the affiliated store server 3.

The affiliated store server 3 checks it against the settlement completion notice received from the settlement execution terminal, and concludes that the settlement result is valid.

In this manner, by generating transaction numbers in the affiliated store server 3 and collectively transmitting settlement results from the electronic money server 2 to the affiliated store server 3, it is made possible to reduce the number of connections to the electronic money server 2 and the amount of information to be processed, thereby reducing burden on the electronic money server 2.

In addition, the settlement execution terminal does not have to activate the mailer, and therefore the user can smoothly carry out a process from proposing purchase of merchandise or service to making settlement.

Note that calculation rules used by affiliated store servers 3 may vary from one to another, or the same calculation rule may be used by different affiliated store servers 3.

When a different calculation rule is employed for each affiliated store server 3, the level of security can be enhanced as compared to the case where the same calculation rule is used among the affiliated store servers.

In the case of using a different calculation rule for each affiliated store server 3, the electronic money server 2 associates affiliated store IDs with calculation rules, so that a calculation rule that is to be used can be identified by an affiliated store ID associated therewith.

While the present embodiment has been described with respect to the case where settlement results are collectively notified from the electronic money server 2 to the affiliated store server 3 by batch processing, it is also possible to, if desired by the affiliated store, notify the settlement results one by one upon each settlement.

Further, instead of using the transaction number, it is possible to use a signature based on a public-key cryptosystem using a public digital certificate.

(Variant)

A variant of the settlement system 1 will now be described. In this variant, the transaction number is generated by the settlement execution terminal (the cell phone 7 or the PC 17).

Generating the transaction number by the settlement execution terminal is suitable when providing merchandise and services, such as paid downloads of content, which do not require affiliated stores to manage inventory on their own.

Specifically, in the case of selling merchandise that requires inventory management, transactions are performed within the range of inventory quantities, and therefore it is necessary to generate the transaction number such that the number of transactions does not exceed the range of inventory quantities.

However, paid downloads of content are not limited in number of sales, and therefore it is not necessary to manage inventory quantities. In this case, by transferring the role of generating the transaction number to the settlement execution terminal, it is possible to reduce burden on the affiliated store servers 3.

In the present variant, the seed and the calculation rule are stored in the settlement execution terminal, and as for the seed, the electronic money server 2 provides a seed within its valid time limit to the settlement execution terminal on a regular basis or on an irregular or as necessary basis. Also, the affiliated store server 3 may hold the seed, and when a transaction is performed between the settlement execution terminal and the affiliated store server 3, the affiliated store server 3 may transmit the seed to the settlement execution terminal.

Figure 10:
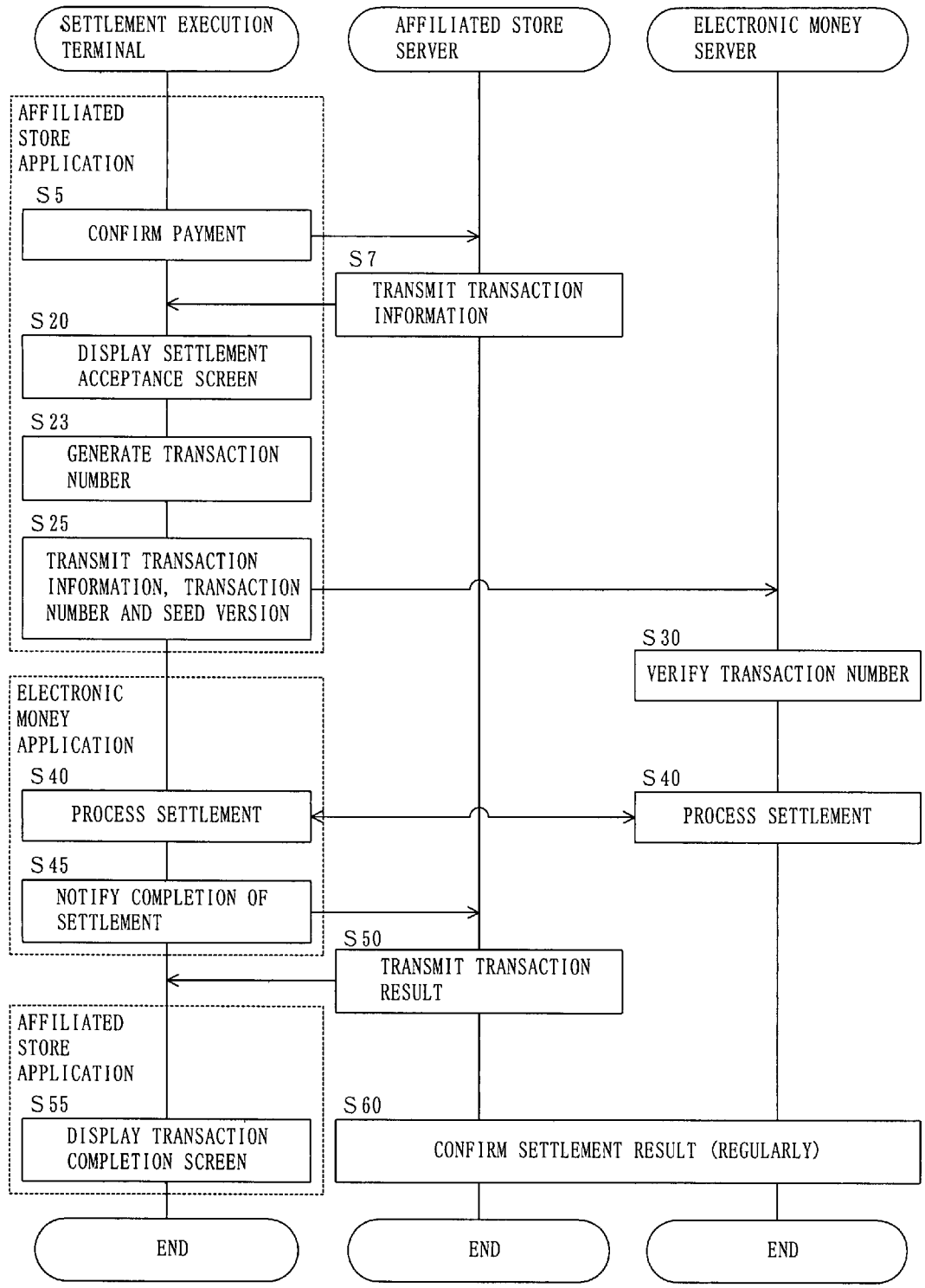
FIG. 10 is a flowchart for explaining a procedure for performing a settlement process according to a variant of the embodiment.
Figure 11:
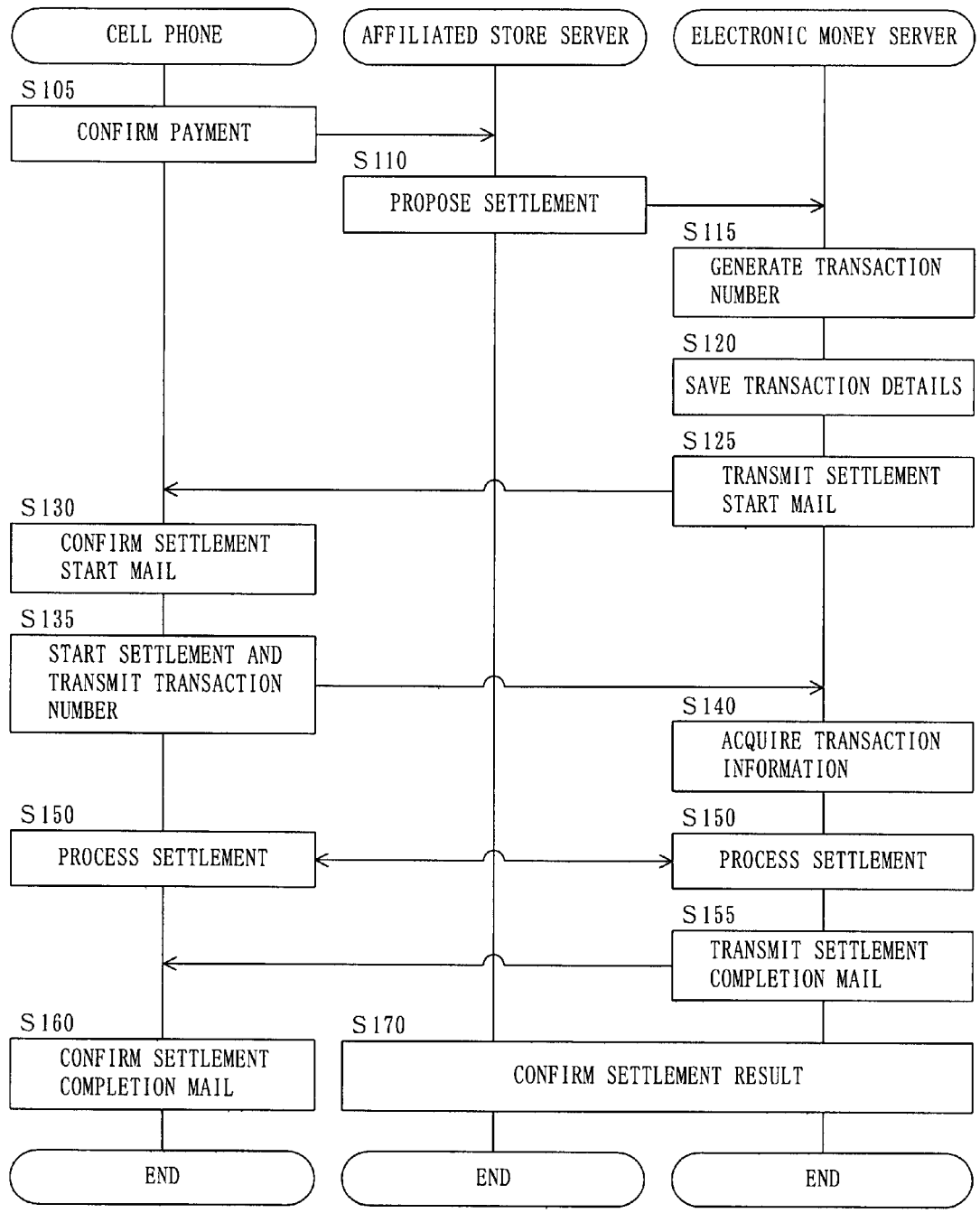
FIG. 11 is a flowchart for explaining an example of unpublished conventional art.

The settlement procedure according to the present variant will be described below with reference to a flowchart in FIG. 10.

Figure 9:
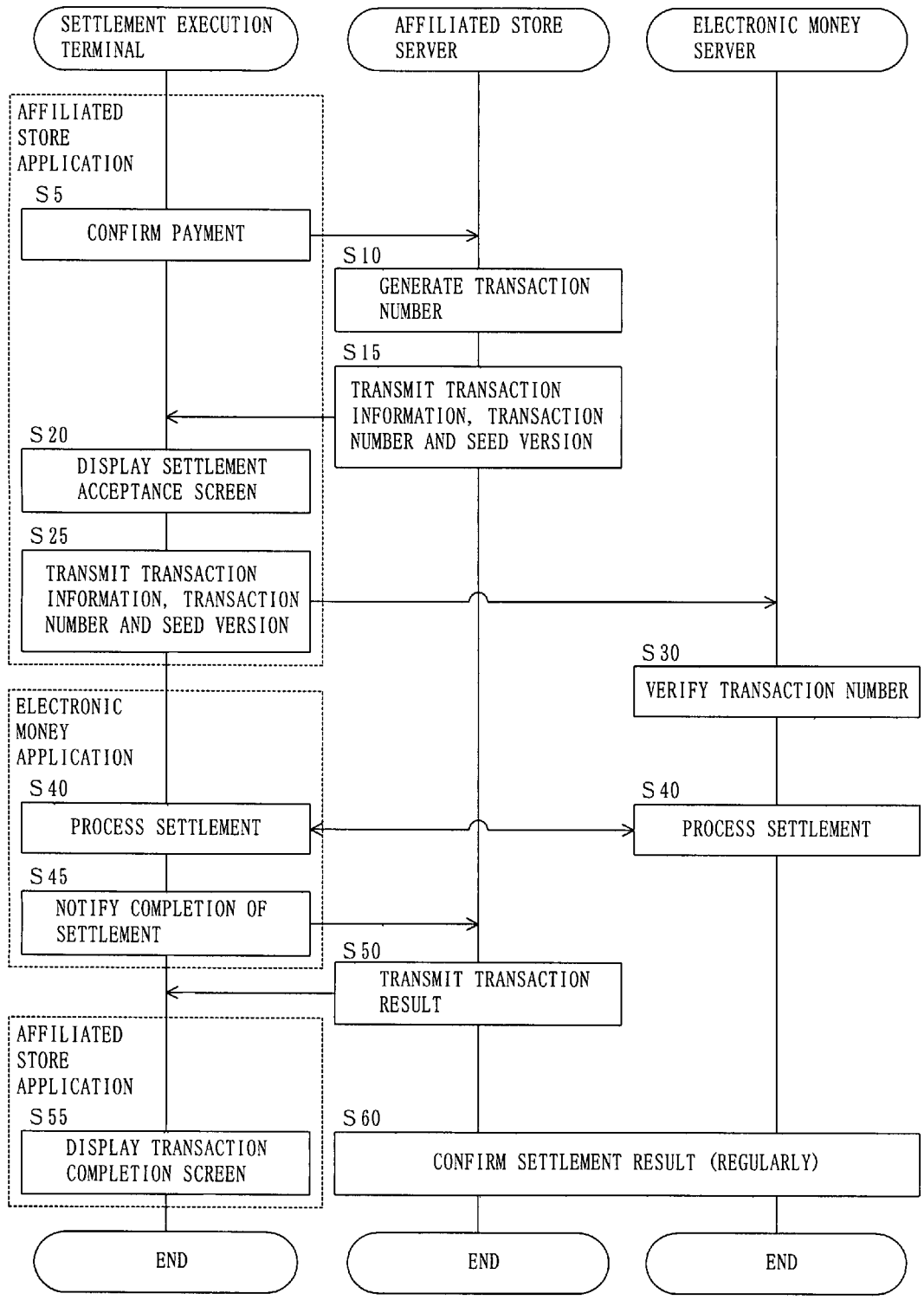
FIG. 9 is a flowchart for explaining a procedure for performing a settlement process.

Note that the same steps as those in FIG. 9 are denoted by the same step numerals, and the description thereof will be simplified or omitted.

First, when the user confirms a payment amount with the settlement execution terminal (step 5), the affiliated store server 3 generates transaction information, and transmits it to the settlement execution terminal (step 7).

The settlement execution terminal displays a settlement acceptance screen to ask the user to confirm his/her intention (step 20).

The settlement execution terminal receives the transaction information and a calculation rule from the affiliated store server 3, and generates a transaction number based on them (step 23).

The transaction information contains an order number and a settlement amount, and the affiliated store server 3 includes a transaction amount reception section.

In addition, the electronic money server 2 includes a calculation section for calculating transaction numbers based on a seed and a calculation rule.

The subsequent processing is the same as that in the flowchart of FIG. 9, and therefore the description thereof will be omitted.

In the present variant, the transaction number is generated by the settlement execution terminal in a manner as described above, and therefore it is possible to reduce burden on the affiliated store server 3.

What is claimed is:

1. A settlement server configured to subtract a monetary value equivalent to a settlement amount demanded by a first settlement request server from a settlement execution terminal having stored a monetary value as electronic information, the settlement execution terminal configured to increase/decrease the monetary value based on amount update information, the settlement server comprising:
   a processor; and
   a memory device storing instructions which when executed by the processor, cause the processor to:
   (a) transmit:
      (i) a first seed to the first settlement request server; and
      (ii) a second, different seed to a second settlement request server;
   (b) receive, from the settlement execution terminal:
      (i) transaction identification information for identifying a transaction with the first settlement request server;
      (ii) the settlement amount; and
      (iii) a first calculation result for a predetermined calculation performed on the settlement amount, the first calculation result being determined by the first settlement request server, the first settlement request server using the first seed to determine the first calculation result;
   (c) determine a second calculation result by performing the predetermined calculation on at least the received amount and the first seed;
   (d) determine whether the second calculation result is equal to the received first calculation result;
   (e) determine whether the received amount is equal to the settlement amount; and
   (f) in response to the received amount and the settlement amount being equal, transmit, to the settlement execution terminal, amount update information for subtracting a monetary value equivalent to the received amount.

2. The settlement server of claim 1, wherein the instructions, when executed by the processor, cause the processor to:
   (a) determine a third calculation result by performing the predetermined calculation on the received amount information and the received transaction information;
   (b) determine whether the third calculation result is equal to the received first calculation result; and
   (c) in response to the third calculation result being equal to the received first calculation result, transmit the amount update information to the settlement execution terminal.

3. The settlement server of claim 1, wherein the first calculation result transmitted from the settlement execution terminal is generated by any of the first settlement request server and the settlement execution terminal.

4. The settlement server of claim 3, wherein the first seed includes a first assigned time limit and the second seed includes a second, different assigned time limit.

5. A settlement request server configured to request a settlement server to subtract a monetary value equivalent to a settlement amount from a settlement execution terminal having stored a monetary value as electronic information, the settlement execution terminal configured to increase/decrease the monetary value based on amount update information, the settlement request server comprising:
   a processor; and
   a memory device storing instructions which when executed by the processor, cause the processor to:
   (a) transmit, to the settlement execution terminal, a first seed from a plurality of seeds, the first seed being transmitted to the settlement request server from the settlement server, the settlement server being configured to transmit a second, different seed to a second, different settlement request server;
   (b) using the first seed, determine a first calculation result by performing a predetermined calculation on the settlement amount;
   (c) transmit, to the settlement server via the settlement execution terminal:
      (i) transaction identification information for identifying a transaction with the settlement request server;
      (ii) the settlement amount; and
      (iii) the first calculation result; and
   (d) confirm, based on a notice from at least one of the settlement server and the settlement execution terminal, that the monetary value stored in the settlement execution terminal is decreased by the settlement amount based on transmitted information.

6. The settlement request server of claim 5, the instructions, when executed by the processor, cause the processor to:
   (a) receive, from the settlement server, the first seed which is assigned a first time limit and a third seed which is assigned a second time limit;
   (b) perform a second calculation based on a predetermined value within a time limit that is selected from among the first seed and the third seed.

7. A settlement execution terminal comprising:
   a processor; and
   a memory device storing instructions which when executed by the processor, cause the processor to:
   (a) receive, from the settlement request server:
      (i) transaction identification information for identifying a transaction with the settlement request server; and
      (ii) a settlement amount;
   (b) perform a predetermined calculation on the received settlement amount;
   (c) transmit, to the settlement server:
      (i) the received transaction identification information;
      (ii) the settlement amount; and
      (iii) a calculation result calculated by the settlement request server using a seed which is provided by the settlement server;
   (d) receive, from the settlement server, amount update information generated based on the transmitted information; and
   (e) input the received amount update information to a monetary terminal having stored a monetary value as electronic information, the monetary terminal configured to increase/decrease the monetary value based on the amount update information.

8. The settlement execution terminal of claim 7, wherein the instructions, when executed by the processor, cause the processor to:
   (a) receive, from the settlement server, the first seed which is assigned a first time limit and a third seed which assigned a second time limit;
   (b) perform a calculation based on a predetermined value within a time limit that is selected from among the first seed and the third seed.

\* \* \* \* \*